United States Patent [19]

Katagiri et al.

[11] Patent Number: 5,648,830

[45] Date of Patent: *Jul. 15, 1997

[54] LIQUID CRYSTAL DEVICE HAVING COMPOSITION OF AT LEAST TWO SMECTIC COMPOUNDS AND ONE CHOLESTERIC COMPOUND

[75] Inventors: Kazuharu Katagiri, Tama; Kazuo Yoshinaga, Machida; Shinjiro Okada, Isehara; Junichiro Kanbe, Yokohama, all of Japan

[73] Assignee: Canon Kabushiki Kaisha, Tokyo, Japan

[*] Notice: The term of this patent shall not extend beyond the expiration date of Pat. No. 5,311,343.

[21] Appl. No.: 424,047

[22] Filed: Apr. 19, 1995

Related U.S. Application Data

[60] Continuation of Ser. No. 178,827, Jan. 7, 1994, abandoned, which is a division of Ser. No. 863,781, Apr. 6, 1992, Pat. No. 5,301,049, which is a continuation-in-part of Ser. No. 251,028, Sep. 26, 1988, Pat. No. 5,120,466, which is a continuation of Ser. No. 750,295, Jul. 1, 1985, abandoned.

[30] Foreign Application Priority Data

| Jul. 13, 1984 | [JP] | Japan | 59-146211 |
| Jul. 14, 1984 | [JP] | Japan | 59-146498 |
| Sep. 12, 1984 | [JP] | Japan | 59-190789 |
| Sep. 12, 1984 | [JP] | Japan | 59-190790 |
| Sep. 14, 1984 | [JP] | Japan | 59-192920 |

[51] Int. Cl.$^6$ .............................. G02F 1/13; G02F 1/141
[52] U.S. Cl. .............................. 349/168; 349/37; 349/184
[58] Field of Search ........................... 359/56, 100, 90

[56] References Cited

U.S. PATENT DOCUMENTS

| 4,077,260 | 3/1978 | Gray et al. | 359/105 |
| 4,195,916 | 4/1980 | Coates et al. | 359/90 |
| 4,257,911 | 3/1981 | Gray et al. | 359/104 |
| 4,367,924 | 1/1983 | Clark et al. | 359/56 |
| 4,561,726 | 12/1985 | Goodby et al. | 359/75 |
| 4,563,059 | 1/1986 | Clark et al. | 359/76 |
| 4,576,732 | 3/1986 | Isogai et al. | 359/104 |
| 4,586,791 | 5/1986 | Isogai et al. | 359/104 |
| 4,589,996 | 5/1986 | Inoue et al. | 359/104 |
| 4,592,858 | 6/1986 | Higuchi et al. | 359/104 |
| 4,596,667 | 6/1986 | Inukai et al. | 359/56 |
| 4,613,209 | 9/1986 | Goodby et al. | 359/104 |
| 4,614,609 | 9/1986 | Inoue et al. | 359/104 |
| 4,615,586 | 10/1986 | Geary et al. | 359/100 |
| 4,622,165 | 11/1986 | Kano et al. | 252/299.65 |

(List continued on next page.)

FOREIGN PATENT DOCUMENTS

| 0149398 | 7/1985 | European Pat. Off. | 359/56 |
| 2557719 | 7/1985 | France | 350/350 S |
| 3443011 | 6/1985 | Germany | 359/90 |
| 61-255323 | 11/1986 | Japan | 359/100 |

OTHER PUBLICATIONS

Molecular Crystals & Liq. Crystals, vol. 110, Nos. 1–4 (1984) pp. 175–203.

Crystal Research & Technology, vol. 18, No. 7 (1983) pp. 915–921.

(List continued on next page.)

Primary Examiner—Anita Pellman Gross
Attorney, Agent, or Firm—Fitzpatrick, Cella, Harper & Scinto

[57] ABSTRACT

A liquid crystal device is constituted by (a) a pair of base plates each having an orientation control film thereon, and (b) a liquid crystal composition interposed between the base plates. The liquid crystal composition comprises at least two liquid crystal compounds including at least one liquid crystal compound which has a temperature range in which it shows cholesteric phase. The liquid crystal composition has a temperature range in which it shows cholesteric phase and is placed in chiral smectic phase which has been formed through cholesteric phase on temperature decrease. The liquid crystal composition comprises liquid crystal molecules having long axes forming a pre-tilt in the chiral smectic phase.

4 Claims, 8 Drawing Sheets

U.S. PATENT DOCUMENTS

| | | | |
|---|---|---|---|
| 4,639,089 | 1/1987 | Okada et al. | 359/76 |
| 4,647,398 | 3/1987 | Saito et al. | 359/104 |
| 4,655,561 | 4/1987 | Kanbe et al. | 359/100 |
| 4,664,480 | 5/1987 | Geary et al. | 359/74 |
| 4,668,051 | 5/1987 | Mourey et al. | 359/56 |
| 4,676,925 | 6/1987 | Inoue et al. | 359/104 |
| 4,712,875 | 12/1987 | Tsuboyama et al. | 359/76 |
| 4,714,323 | 12/1987 | Katagiri et al. | 359/56 |
| 4,721,367 | 1/1988 | Yoshinaga et al. | 359/76 |
| 4,737,313 | 4/1988 | Saito et al. | 359/104 |
| 4,741,859 | 5/1988 | McDonnell et al. | 359/90 |
| 4,763,992 | 8/1988 | Takada et al. | 359/100 |
| 4,775,223 | 10/1988 | Yoshinaga et al. | 359/76 |
| 4,775,225 | 10/1988 | Tsuboyama et al. | 359/76 |
| 4,784,792 | 11/1988 | Inoue et al. | 359/104 |
| 4,820,444 | 4/1989 | Inukai et al. | 359/104 |
| 4,834,907 | 5/1989 | Inoue et al. | 359/104 |
| 4,844,597 | 7/1989 | Katagiri et al. | 359/90 |
| 4,876,027 | 10/1989 | Yoshinaga et al. | 359/90 |
| 4,902,107 | 2/1990 | Tsuboyama et al. | 359/56 |
| 4,931,208 | 6/1990 | Furukawa et al. | 359/104 |
| 4,941,736 | 7/1990 | Taniguchi et al. | 359/56 |
| 4,979,805 | 12/1990 | Yoshinaga et al. | 359/104 |
| 5,046,830 | 9/1991 | Nakanowatari | 359/90 |
| 5,120,466 | 6/1992 | Katagiri et al. | 359/76 |
| 5,167,857 | 12/1992 | Yoshinaga et al. | 359/104 |
| 5,301,049 | 4/1994 | Katagiri et al. | 359/90 |
| 5,311,343 | 5/1994 | Katagiri et al. | 359/90 |

OTHER PUBLICATIONS

Japanese Journal of Applied Physics, vol. 23, No. 4 (1984).

Goodby et al., Liqud Crystals Ordered Fluids, vol. 4 (1984) pp. 1–32.

Gray et al., Mol. Cryst. Liq. Cryst., vol. 37 (1976) pp. 157–188.

Patel et al., Ferrolectrics, vol. 59 (1984) pp. 137–144.

LIQUID CRYSTAL DEVICE HAVING COMPOSITION OF AT LEAST TWO SMECTIC COMPOUNDS AND ONE CHOLESTERIC COMPOUND

CROSS-REFERENCE TO RELATED APPLICATIONS

This application is a continuation of application Ser. No. 08/178,827, filed Jan. 7, 1994, now abandoned, which is a division of application Ser. No. 07/863,781, filed Apr. 6, 1992, now U.S. Pat. No. 5,301,049, which is a continuation-in-part of application Ser. No. 07/251,028, filed Sep. 26, 1988, now U.S. Pat. No. 5,120,466, which is a continuation of application Ser. No. 07/750,295, filed Jul. 1, 1985, now abandoned.

BACKGROUND OF THE INVENTION

The present invention relates to a liquid crystal device for use in a liquid crystal display device, an optical shutter array, etc., and more particularly to a liquid crystal device having improved display and driving characteristics, because of improved initial alignment or orientation of liquid crystal molecules.

Hitherto, there have been well known liquid crystal devices using TN (twisted nematic) type liquid crystal as shown, for example, in "Voltage-Dependent Optical Activity of a Twisted Nematic Liquid Crystal" by M. Schadt and W. Helfrich, Applied Physics Letters Vol. 18, No. 4 (Feb. 15, 1971) pp. 127–128. In this type of liquid crystal device, the number of picture elements has been restricted, because there is a problem that a crosstalk phenomenon occurs when a device of a matrix electrode structure with a high density of picture elements is driven according to a time-sharing or time-division driving scheme.

As another type of liquid crystal device, there has been known one comprising a plurality of picture elements each connected to and subject to switching by a thin film transistor as a switching element. This type of liquid crystal device, however, is accompanied with problems such that production of thin film transistors on a substrate is very complicated, and production of a display device with a large picture area or screen is difficult.

In order to obviate the above-mentioned draw-backs of the conventional types of liquid crystal devices, Clark and Lagerwall have proposed the use of a liquid crystal device using a bistable liquid crystal (Japanese Laid-Open Patent Application No. 107216/1981, U.S. Pat. No. 4,367,924, etc.). The bistable liquid crystal to be used may be a ferroelectric liquid crystal having a chiral smectic C (SmC*) phase or another phase such as chiral smectic H (SmH*) phase, chiral smectic F (SmF*) phase, chiral smectic I (SmI*) phase or chiral smectic G (SmG*) phase.

Such a ferroelectric liquid crystal has bistability, i.e., has two stable states comprising a first stable state and a second stable state. Accordingly, different from the conventional TN-type liquid crystal in the above-mentioned device, the liquid crystal is oriented to the first stable state in response to one electric field vector and to the second stable state in response to the other electric field vector. Further, this type of liquid crystal very quickly assumes either one of the above-mentioned two stable states in reply to an electric field applied thereto and retains the state in the absence of an electric field. By utilizing these properties, essential improvements can be attained with respect to the above-mentioned difficulties involved in the conventional TN-type liquid crystal device. This point will be explained hereinafter in further detail in connection with the present invention.

However, in order that an optical modulation device using the liquid crystal having bistability could show desired operation performances, the liquid crystal interposed between a pair of parallel base plates is required to be placed in such a state of molecular arrangement that the transition between the two stable states can effectively occur, as a matter different from, or a precondition of, the application of an electric field. With respect to, for example, a ferroelectric liquid crystal having an SmC* or other phases, there must be formed a monodomain wherein the layers of the liquid crystal molecules are perpendicular to the face of the base plate and therefore the axes of the liquid crystal molecules are almost in parallel with the base plate face. However, in the optical modulation devices using a bistable liquid crystal, and orientation or alignment state of a liquid crystal having such a monodomain structure cannot satisfactorily be formed, whereby the optical modulation device cannot actually show sufficient performances.

For example, several methods have been proposed to give such an orientation state, including a method of applying a magnetic field and a method of applying a shearing force. These methods have not necessarily provided satisfactory results. For example, the method of applying a magnetic field requires a large size of apparatus and is not readily compatible with a thin layer cell which is generally excellent in operation performances. On the other hand, the method of applying a shearing force is not compatible with a process where a cell structure is first formed and then a liquid crystal is poured thereinto.

SUMMARY OF THE INVENTION

A principal object of the present invention is, in view of the above-mentioned circumstances, to provide an improvement in monodomain formability or initial alignment, of which an improvement has been desired, to an optical modulation device suing a bistable liquid crystal, which is potentially suited for a display device with a high response speed, picture elements arranged at a high density and a large display area or an optical shutter having a high shutter speed, thereby to allow the optical modulation device to fully exhibit their excellent characteristics.

We have made a further study with the above object, noting the orientation characteristics of a liquid crystal during a temperature decreasing stage for causing transition from another phase (e.g., a higher temperature phase such as an isotropic phase) of the liquid crystal to lower temperature phase such as a smectic phase, e.g., SmA (smectic A phase). As the result, we have observed that a monodomain where liquid crystal molecules of, e.g., smectic A phase are aligned in one direction can be formed by using a liquid crystal composition comprising a liquid crystal showing at least a chiral smectic phase such as chiral smectic C (SmC*) phase, chiral smectic H (SmH*) phase, chiral smectic F (SmF*) phase, chiral smectic I (SmI*) phase or chiral smectic G (SmG*) phase and a liquid crystal showing at least a cholesteric phase, and by imparting a function of orienting molecular axes of the liquid crystal molecules preferentially in one direction to a face of a base plate contacting the liquid crystal composition, whereby a liquid crystal device having operation characteristics based on the bistability of the liquid crystal and a monodomain formation characteristic of the liquid crystal layer in combination is provided.

The liquid crystal device according to the present invention is based on the above finding and, more particularly, comprises a pair of base plates and a liquid crystal composition interposed between the pair of base plates; the liquid crystal composition comprising a liquid crystal showing at least chiral smectic phase and a liquid crystal showing at least cholesteric phase; a face of at least one of the pair of base plates having been provided with a function of preferentially orienting the axes of the liquid crystal molecules contacting the face in one direction.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Figure 1:
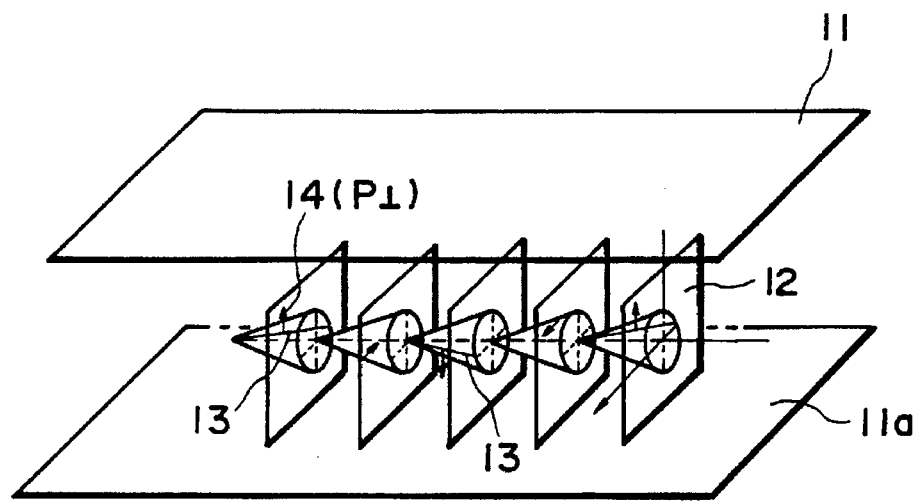
FIGS. 1 and 2 are schematic perspective views illustrating the basic operation principle of a liquid crystal cell used in the present invention.

The liquid crystal composition used in the present invention is one which comprises a liquid crystal showing at least a chiral smectic phase such as SmC*, SmH*, SmF*, SmI* or SmG* and a liquid crystal showing at least a cholesteric phase and shows a ferroelectricity.

Specific examples of the liquid crystal showing a chiral smectic phase and the liquid crystal showing a cholesteric phase available for the present invention are shown in Table 1 and Table 2, respectively.

TABLE 1

Specific examples of liquid crystal showing chiral smectic phase
(compound name, structural formula and phase transition temperature)

(1)

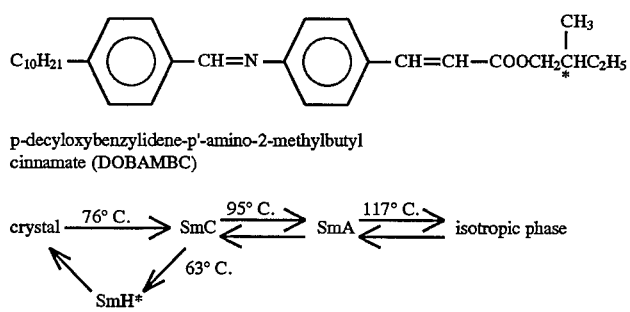

p-decyloxybenzylidene-p'-amino-2-methylbutyl cinnamate (DOBAMBC)

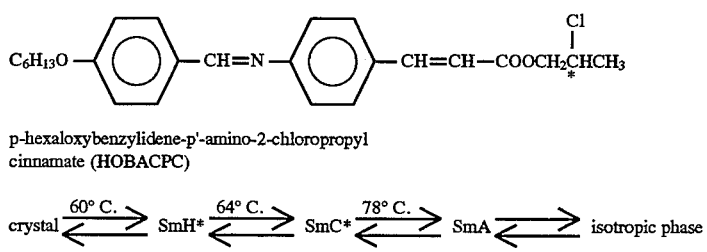

(2)

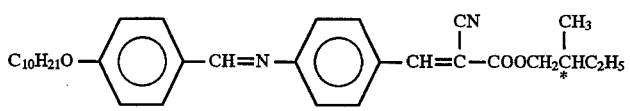

p-hexaloxybenzylidene-p'-amino-2-chloropropyl cinnamate (HOBACPC)

crystal $\xrightleftharpoons{60° C.}$ SmH* $\xrightleftharpoons{64° C.}$ SmC* $\xrightleftharpoons{78° C.}$ SmA $\xrightleftharpoons{}$ isotropic phase (3)

TABLE 1-continued

Specific examples of liquid crystal showing chiral smectic phase
(compound name, structural formula and phase transition temperature)

p-decyloxybenzylidene-p'-amino-2-methylbutyl-α-cyanocinnamate (DOBAMBCC)

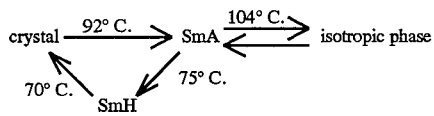

(4)

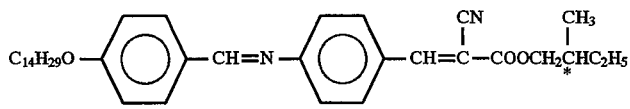

p-tetradecyloxybenzylidene-p'-amino-2-methylbutyl-α-cyanocinnamate (TDOBAMBCC)

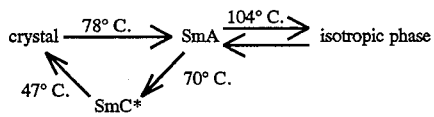

(5)

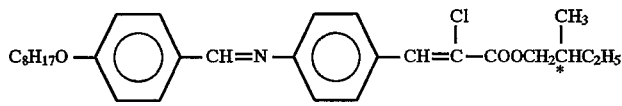

p-octyloxybenzylidene-p'-amino-2-methylbutyl-α-chlorocinammate (DOOBAMBCC)

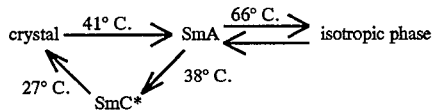

(6)

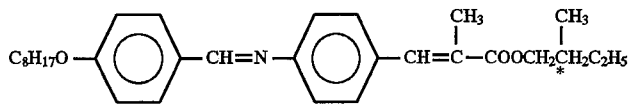

p-octyloxybenzylidene-p'-amino-2-methylbutyl-α-methylcinnamate

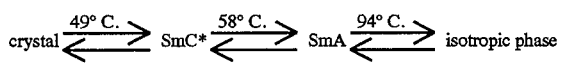

(7)

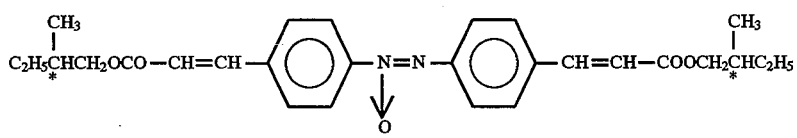

4,4'-azoxycinnamic acid-bis(2-methylbutyl)ester

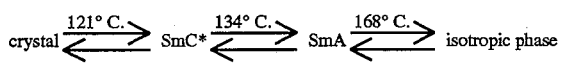

TABLE 1-continued

Specific examples of liquid crystal showing chiral smectic phase
(compound name, structural formula and phase transition temperature)

(8)

$$C_2H_5\overset{CH_3}{\underset{|}{CH}}CH_2O-\bigcirc-CH=N-\bigcirc-C_8H_7$$
$$\phantom{C_2H_5CHCH_2O-}\underset{OH}{|}$$

4-O-(2-methyl)-butylresorcylidene-4'-octylaniline
(MBRA 8)

$$\text{crystal} \xrightleftharpoons{280°\,C.} SmC^* \xrightleftharpoons{55°\,C.} SmA \xrightleftharpoons{62°\,C.} \text{isotropic phase}$$

TABLE 2

Specific examples of liquid crystals showing cholesteric phase
(compound name, structured formula and phase transition temperature)

(A) Cholesteryl propionate $$\text{crystal} \xrightleftharpoons{107°\,C.} \text{cholesteric phase} \xrightleftharpoons{117°\,C.} \text{isotropic phase}$$

(B) Cholesteryl nonamate $$\text{crystal} \xrightleftharpoons{78°\,C.} \text{cholesteric phase} \xrightleftharpoons{92°\,C.} \text{isotropic phase}$$

(C) Cholesteryl palmitate $$\text{crystal} \xrightleftharpoons{77°\,C.} \text{cholesteric phase} \xrightleftharpoons{83°\,C.} \text{isotropic phase}$$

(D) Cholesteryl benzoate $$\text{crystal} \xrightleftharpoons{148°\,C.} \text{cholesteric phase} \xrightleftharpoons{176°\,C.} \text{isotropic phase}$$

(E)

$$C_2H_5\overset{CH_3}{\underset{\underset{*}{|}}{CH}}CH_2-\bigcirc-\bigcirc-CN$$

4-(2"-methylbutyl)-4'-cyanobiphenyl crystal $\xrightarrow{4°\,C.}$ isotropic phase
$\nwarrow \qquad \swarrow\; -30°\,C.$
SmA $\xleftarrow{54°\,C.}$ cholesteric phase (G)

$$C_2H_5\overset{CH_3}{\underset{\underset{*}{|}}{CH}}CH_2-\bigcirc-COO-\bigcirc-COO-\bigcirc-C_8H_{17}$$

4-octylphenyl-4'-(4-β-methylbenzoyloxy)benzoate $$\text{crystal} \xrightleftharpoons{72.6°\,C.} \text{cholesteric phase} \xrightleftharpoons{154.3°\,C.} \text{isotropic phase}$$

TABLE 2-continued

Specific examples of liquid crystals showing cholesteric phase
(compound name, structured formula and phase transition temperature)

(H)

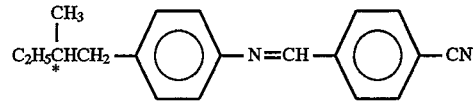

4-cyanobenzylidene-4'-(2-methylbutyl)aniline crystal ⇌ 51° C. → isotropic phase ⇌ 26.5° C. cholesteric phase (I)

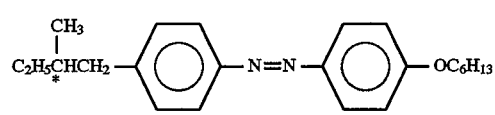

3-(2-methylbutyl)-4'-hexyloxyazobenzene crystal ⇌ 35.9° C. ⇌ cholesteric phase ⇌ 58.2° C. ⇌ isotropic phase (J)

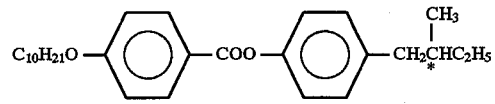

4-(2-methylbutyl)phenyl-4'-decyloxybenzoate crystal ⇌ 41.8° C. ⇌ SmA ⇌ 42.2° C. ⇌ cholesteric phase ⇌ 45.3° C. ⇌ isotropic phase (K)

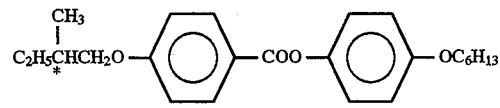

4-hexyloxy-4'-(2-methylbutyl)benzoate crystal ⇌ 22° C. → isotropic phase ⇌ 17° C. cholesteric phase The above-mentioned liquid crystals showing a chiral smectic phase and liquid crystals showing a cholesteric phase may respectively be used in combination of two or more species from each group.

While the proportion between the two types of liquid crystals can vary depending on particular liquid crystals used, the liquid crystal showing a cholesteric phase may generally be used in an amount of 0.1 to 50 parts by weight, preferably 1 to 20 parts by weight with respect to 100 parts by weight of the liquid crystal showing a chiral smectic phase.

In a preferred embodiment, a liquid crystal causing successive phase transition of isotropic phase, cholesteric phase, SmA phase and chiral smectic phase, in the order named, on temperature decrease, may be used in place of the liquid crystals shown in Table 1. Specific examples of such a liquid crystal are enumerated in Table 3 below.

TABLE 3

Specific examples of liquid crystal showing
chiral smectic phase (compound name, structural
formula and phase transition temperature)

(1)

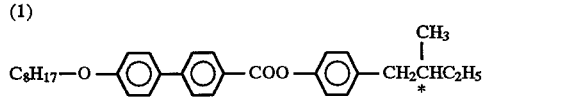

4-(2'-methylbutyl)phenyl-4'-octyloxybiphenyl-4-carboxylate

TABLE 3-continued

Specific examples of liquid crystal showing chiral smectic phase (compound name, structural formula and phase transition temperature)

$$\text{crystal} \xrightleftharpoons{78°\text{ C.}} \text{Sm3} \xrightleftharpoons{80°\text{ C.}} \text{SmC*} \xrightleftharpoons{128.3°\text{ C.}} \text{SmA}$$
(unknown phase)

$$\xrightleftharpoons{171.0°\text{ C.}} \text{cholesteric phase} \xrightleftharpoons{174.2°\text{ C.}} \text{isotropic phase}$$

(2)

$$\underset{*}{\text{C}_2\text{H}_5\overset{\overset{\text{CH}_3}{|}}{\text{CH}}}\text{(CH}_2\text{)}_3-\bigcirc-\bigcirc-\text{COO}-\bigcirc-\text{C}_7\text{H}_{15}$$

4-heptylphenyl-4-(4"-methylhexyl)biphenyl-4'-carboxylate $$\text{crystal} \xrightleftharpoons{91.5°\text{ C.}} \text{SmC*} \xrightleftharpoons{93°\text{ C.}} \text{SmA} \xrightleftharpoons{112°\text{ C.}}$$

$$\text{cholesteric phase} \xrightleftharpoons{131°\text{ C.}} \text{isotropic phase}$$

TABLE 3-continued

Specific examples of liquid crystal showing chiral smectic phase (compound name, structural formula and phase transition temperature)

(3)

$$\text{C}_8\text{H}_{17}\text{O}-\bigcirc-\text{COO}-\bigcirc-\text{O}-\text{CH}_2-\underset{*}{\overset{\overset{\text{CH}_3}{|}}{\text{CH}}}-\text{C}_2\text{H}_5$$

p-n-octyloxybenzoic acid-p'-(2-methylbutyloxy)-phenyl ester $$\text{crystal} \xrightleftharpoons{40.5°\text{ C.}} \text{SmC*} \xrightleftharpoons{42°\text{ C.}} \text{SmA} \xrightleftharpoons{58°\text{ C.}}$$

$$\text{cholesteric phase} \xrightleftharpoons{65°\text{ C.}} \text{isotropic phase}$$

The liquid crystals shown in Table 3 may also be used in two or more species in combination.

In another preferred embodiment of the present invention, a liquid crystal causing successive phase transition of isotropic phase, cholesteric phase and chiral smectic phase, in the order named, on temperature decrease, may be used in place of the liquid crystals showing chiral smectic phase as mentioned above. Specific examples of such a liquid crystal are enumerated in Table 4 below.

TABLE 4

Specific examples of liquid crystal showing chiral smectic phase (compound name, structural formula and phase transition temperature)

(1)

$$\underset{*}{\text{C}_2\text{H}_5\overset{\overset{\text{CH}_3}{|}}{\text{CH}}\text{CH}_2}-\bigcirc-\bigcirc-\text{COO}-\bigcirc-\text{OC}_6\text{H}_{13}$$

4-hexyloxyphenyl-4-(2"-methylbutyl)biphenyl-4'-carboxylate $$\text{crystal} \xrightleftharpoons{68.8°\text{ C.}} \text{SmC*} \xrightleftharpoons{80.2°\text{ C.}} \text{cholesteric phase}$$

$$\xrightleftharpoons{163.5°\text{ C.}} \text{isotropic phase}$$

(2)

$$\underset{*}{\text{C}_2\text{H}_5\overset{\overset{\text{CH}_3}{|}}{\text{CH}}\text{CH}_2}-\bigcirc-\bigcirc-\text{COO}-\bigcirc-\text{OC}_8\text{H}_{17}$$

4-octyloxyphenyl-4-(2"-methylbutyl)biphenyl-4'-carboxylate $$\text{crystal} \xrightleftharpoons{76°\text{ C.}} \text{SmC*} \xrightleftharpoons{88.6°\text{ C.}} \text{cholesteric phase}$$

$$\xrightleftharpoons{155.4°\text{ C.}} \text{isotropic phase}$$

TABLE 4-continued

Specific examples of liquid crystal showing chiral smectic phase (compound name, structural formula and phase transition temperature)

(3)

$$C_2H_5\underset{*}{C}H\text{-}(CH_2)_5\text{-}\phantom{|}\overset{\displaystyle CH_3}{|}\phantom{|}\text{-}\bigcirc\text{-}\bigcirc\text{-}CH=H\text{-}\bigcirc\overset{\displaystyle Cl}{\text{-}}\text{-}N=CH\text{-}\bigcirc\text{-}$$

$$O(CH_2)_5\underset{*}{C}HC_2H_5 \quad \text{with } CH_3$$

$$\text{crystal} \underset{\longleftarrow}{\overset{35° C.}{\longrightarrow}} \text{SmC*} \underset{\longleftarrow}{\overset{93° C.}{\longrightarrow}} \text{cholesteric phase}$$

$$\underset{\longleftarrow}{\overset{145° C.}{\longrightarrow}} \text{isotropic phase}$$

The liquid crystals of the type as shown in the Table 4 may be used in combination of two or more species.

According to still another preferred embodiment of the present invention, the liquid crystal composition is composed as a ferroelectric composition comprising at least two liquid crystals which show at least a chiral smectic phase; at least one of the liquid crystals showing further a cholesteric phase. More specifically the chiral smectic phase may be SmC*, SmF*, SmI* or SmG*.

Specific examples of the liquid crystals constituting this embodiment of the liquid crystals are shown in Tables 1, 3 and 4 described above. These liquid crystals selected from each group may also be used in combination of two or more species.

In this embodiment of the composition, while the proportion of the two types of the liquid crystals can vary depending on particular liquid crystals used, the liquid crystal showing cholesteric phase as well as a chiral smectic phase may generally be used in a proportion of 0.1 to 50 parts by weight, preferably 0.1 to 10 parts by weight, with respect to 1 part by weight of the liquid crystal showing a chiral smectic phase but not a cholesteric phase.

According to a further preferred embodiment of the present invention, the liquid crystal composition may be composed of a combination of a liquid crystal (referred to as "liquid crystal A") causing successive phase transition of isotropic phase, cholesteric phase, smectic A phase and chiral smectic phase (inclusive of SmC*, SmH*, SmF*, SmI*, SmJ*, SmK*, SmI*, SmG*) in the order named on temperature decrease, and a liquid crystal (referred to as "liquid crystal B") causing successive phase transition of isotropic phase, cholesteric phase and chiral smectic phase. Specific examples of the liquid crystals A and B are shown in Tables 3 and 4, respectively. The composition of this embodiment, when sandwiched between base plates to a face of which has been imparted a function of orienting molecular axes of the liquid crystal molecules preferentially in one direction, provides a monodomain wherein liquid crystal molecules are aligned uniformly in one direction, whereby a liquid crystal device having operation characteristics based on the bistability of the liquid crystal and a monodomain formation characteristic of the liquid crystal layer in combination is provided.

In this embodiment, a composition further comprising a liquid crystal (referred to as "liquid crystal C") which causes successive phase transition of isotropic phase, smectic phase and chiral smectic phase, in the order named, on temperature decrease, provides a still better orientation stability for a longer period of time than the above-mentioned composition.

The liquid crystal device according to this embodiment of the invention may be expressed as one comprising a pair of base plates and a liquid crystal composition interposed therebetween; the liquid crystal composition comprising a liquid crystal A, a liquid crystal B and, preferably, a liquid crystal C; a face of at least one of the pair of base plates having been provided with a function of preferentially orienting the axes of the liquid crystal molecules contacting the face in one direction.

The proportions of the liquid crystals A and B in the liquid crystal composition can vary depending on particular liquid crystals used but generally be such that the liquid crystal A is used in 0.05 to 20 parts by weight, preferably 0.5 to 2 parts by weight with respect to i part by weight of the liquid crystal B. The proportion of the liquid crystal C, when used, is such that it constitutes 0.1 to 40% by weight, preferably 5 to 20% by weight, of the resultant liquid crystal composition.

The liquid crystal composition according to the present invention may preferably be so composed that it will because successive phase transition of isotropic phase, cholesteric phase, smectic A phase and chiral smectic phase, in the order named, on temperature decrease.

When a device is constituted using these materials, the device may be supported with a block of copper, etc., in which a heater is embedded in order to realize a temperature condition where the liquid crystal composition assumes a desired chiral smectic phase.

Referring to FIG. 1, there is schematically shown an example of a ferroelectric liquid crystal cell for explanation of the operation thereof. Reference numerals 11 and 11a denote base plate (glass plates) on which a transparent electrode of, e.g., $In_2O_3$, $SnO_2$, ITO (Indium-Tin Oxide), etc., is disposed respectively. A liquid crystal of a chiral smectic phase such as SmC*, SmH*, SmF*, SmI* or SmG* in which liquid crystal molecular layers 12 are oriented perpendicular to surfaces of the glass plates is hermetically disposed therebetween. A full line 13 shows liquid crystal molecules. Each liquid crystal molecule 13 has a dipole moment (P⊥) 14 in a direction perpendicular to the axis thereof. When a voltage higher than a certain threshold level is applied between electrodes formed on the base plates 11 and 11a, a helical structure of the liquid crystal molecule 13 is loosened or unwound to change the alignment direction of respective liquid crystal molecules 13 so that the dipole moment (P⊥) 14 ar all directed in the direction of the electric field. The liquid crystal molecules 13 have an elongated shape and show refractive anisotropy between the long axis and the short axis thereof. Accordingly, it is easily understood that when, for instance, polarizers arranged in a cross nicol relationship, i.e., with their polarizing directions crossing each other, are disposed on the upper and the lower surfaces of the glass plates, the liquid crystal cell thus arranged functions as a liquid crystal optical modulation device of which optical characteristics vary depending upon the polarity of an applied voltage.

Figure 2:
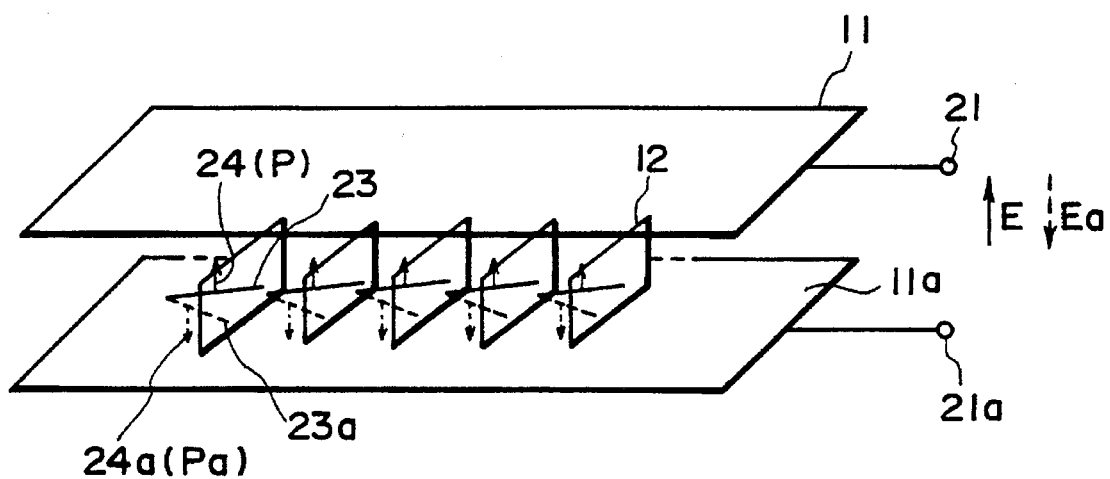

The liquid crystal layer in the liquid crystal device of the present invention may be rendered sufficiently thin in thickness (e.g., less than 10μ). As the thickness of the liquid crystal layer is decreased, the helical structure of the liquid crystal molecules is loosened even in the absence of an electric field whereby the dipole moment assumes either of the two states, i.e., P in an upper direction 24 or Pa in a lower direction 24a as shown in FIG. 2. When electric field E or Ea higher than a certain threshold level and different from each other in polarity as shown in FIG. 2 is applied to a cell having the above-mentioned characteristics, the dipole moment is directed either in the upper direction 24 or in the lower direction 24a depending on the vector of the electric field E or Ea. In correspondence with this, the liquid crystal molecules are oriented in either of a first stable state 23 and a second stable state 23a.

When the above-mentioned ferroelectric liquid crystal is used as an optical modulation element, it is possible to obtain two advantages as briefly touched on hereinbefore. First is that the response speed is quite fast. Second is that the orientation of the liquid crystal shows bistability. The second advantage will be further explained, e.g., with reference to FIG. 2. When the electric field E is applied to the liquid crystal molecules, they are oriented in the first stable state 23. This state is kept stable even if the electric field is removed. On the other hand, when the electric field Ea of which direction is opposite to that of the electric field E is applied thereto, the liquid crystal molecules are oriented to the second stable state 23a, whereby the directions of molecules are changed. This state is similarly kept stable even if the electric field is removed. Further, as long as the magnitude of the electric field E being applied is not above a certain threshold value, the liquid crystal molecules are placed in the respective orientation states. In order to effectively realize high response speed and bistability, it is preferable that the thickness of the cell is as thin as possible.

The most serious problem encountered in forming a device using such a ferroelectric liquid crystal has been, as briefly mentioned hereinbefore, that it is difficult to form a cell having a highly uniform monodomain wherein liquid crystal layers having a chiral smectic phase such as SmC*, SmH*, SmF*, SmI* or SmG* are aligned perpendicular to the base plate phases and the liquid crystal molecules are aligned almost in parallel with the base plate phases. A principal object of the invention is to provide a solution to this problem.

Figure 3A:
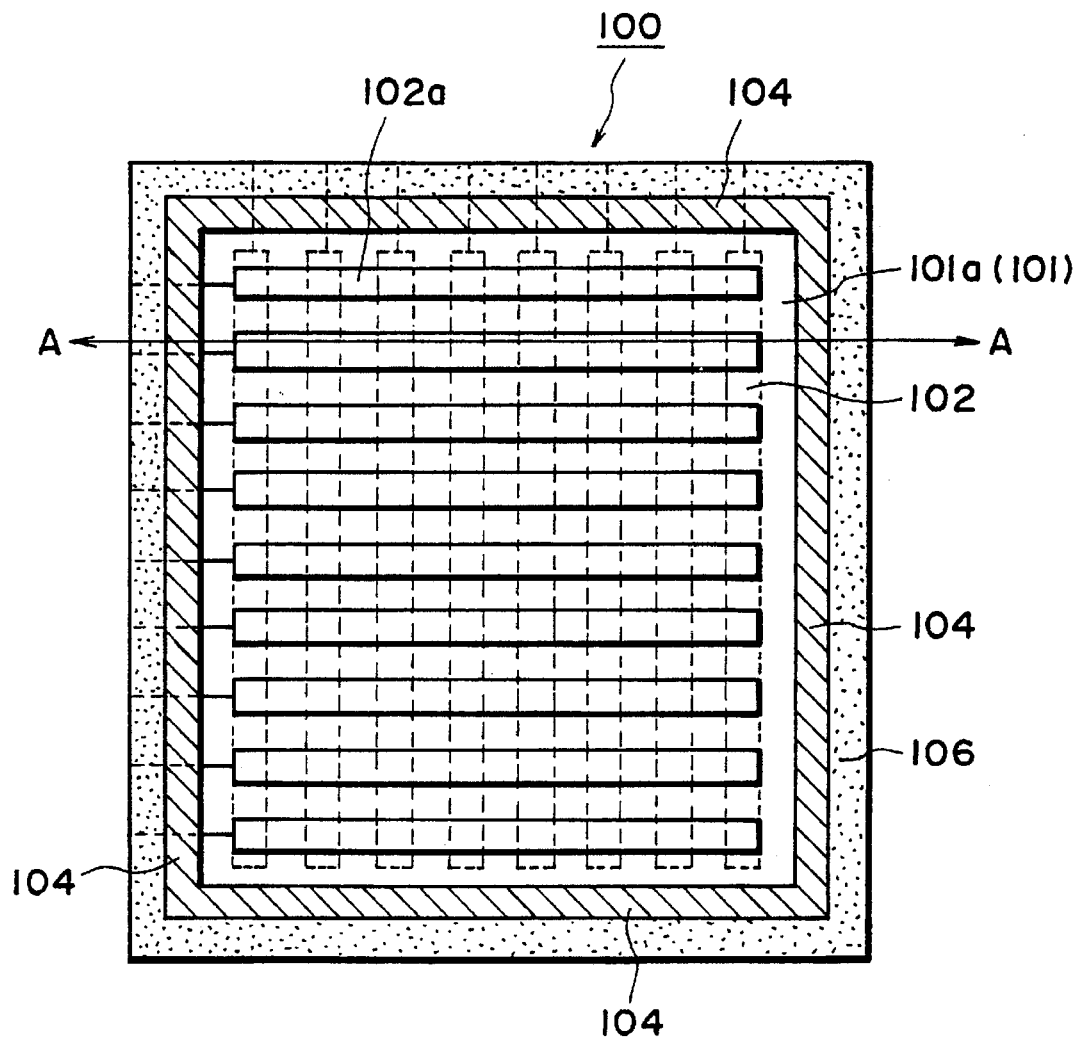
FIG. 3A is a plan view showing an example of the liquid crystal device according to the present invention.
Figure 3B:
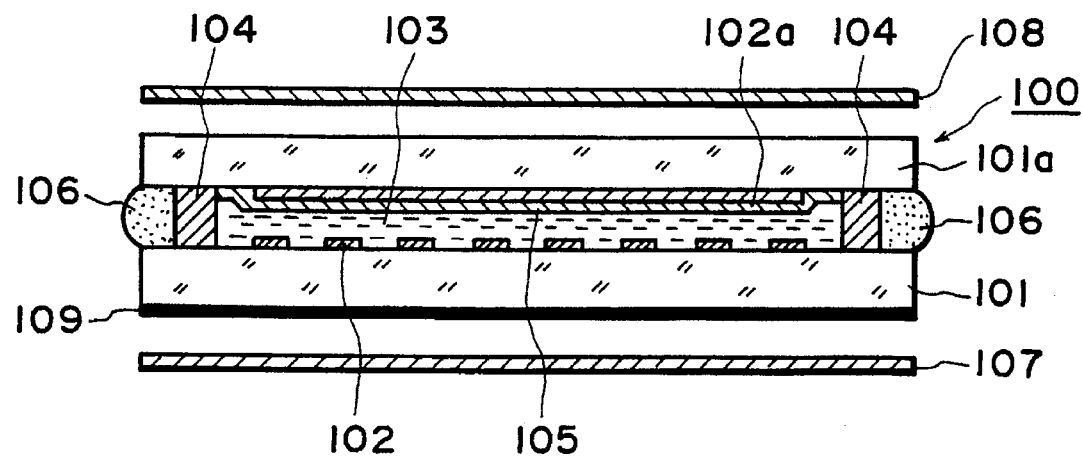
FIG. 3B is a sectional view taken along the line A—A in FIG. 3A.

FIGS. 3A and 3B illustrate an example of the liquid crystal device according to the present invention. FIG. 3A is a plan view of the example and FIG. 3B is a sectional view taken along the line A—A in FIG. 3A.

A cell structure 100 shown in FIG. 3 comprises a pair of base plates 101 and 101a made of glass plates or plastic plates which are held with a predetermined gap with spacers 104 and sealed with an adhesive 106 to form a cell structure. On the base plate 101 is further formed an electrode group (e.g., an electrode group for applying scanning voltages of a matrix electrode structure) comprising a plurality of transparent electrodes in a predetermined pattern, e.g., of a stripe pattern. On the base plate 101 is formed another electrode group (e.g., an electrode group for applying signal voltages of the matrix electrode structure) comprising a plurality of transparent electrodes 102a crossing the transparent electrodes 102.

On the base plate provided with such transparent electrodes may be further formed an orientation controlling film 105 composed of an inorganic insulating material such as silicon monoxide, silicon dioxide, aluminum oxide, zirconia, magnesium fluoride, cerium oxide, cerium fluoride, silicon nitride, silicon carbide, and boron nitride, or an organic insulating material such as polyvinyl alcohol, polyimide, polyamide-imide, polyester-imide, polyparaxylylene, polyester, polycarbonate, polyvinyl acetal, polyvinyl chloride, polyamide, polystyrene, cellulose resin, melamine resin, urea resin and acrylic resin.

The orientation controlling film 105 may be formed by first forming a film of an inorganic insulating material or an organic insulating material as described above and then rubbing the surface thereof in one direction with velvet, cloth, paper, etc.

In another preferred embodiment according to the present invention, the orientation controlling film 105 may be formed as a film of an inorganic insulating material such as SiO or SiO$_2$ on the base plate 101a by the oblique or tilt vapor deposition.

Figure 5:
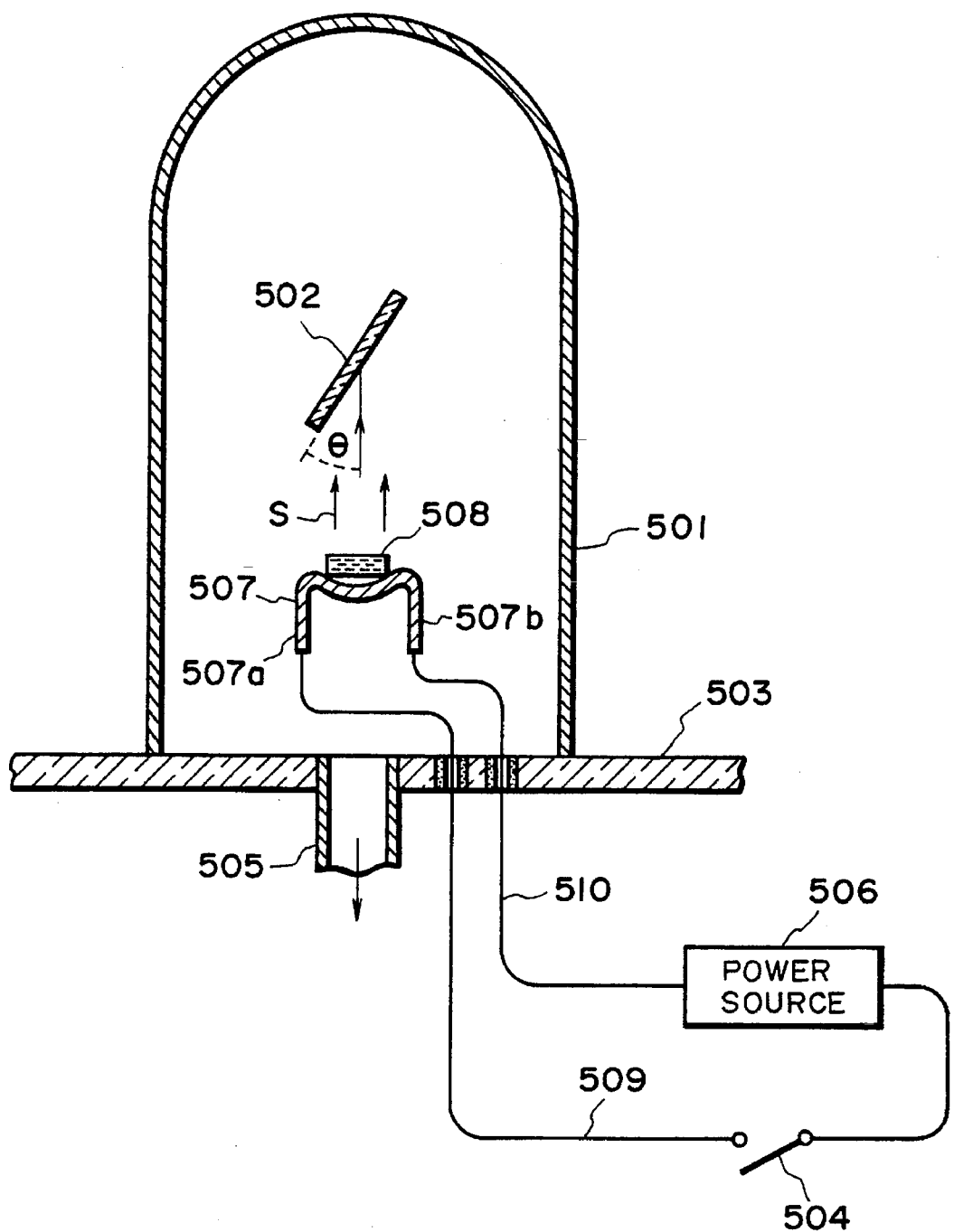
FIG. 5 is a sectional view schematically showing a tilt or oblique vapor deposition apparatus for use in production of the liquid crystal device according to the present invention.

In an apparatus shown in FIG. 5, a bell jar 501 is placed on an insulating base plate 503 provided with a suction hole 505 and the bell jar 501 is made vacuum by operating a vacuum pump (not shown) connected the suction hole 505. A crucible 507 made of tungsten or molybdenum is place inside and at the bottom of the bell jar 501. In the crucible 507 is paced several grams of a crystal such as SiO, SiO$_2$ or MgF$_2$. The crucible 507 has two downwardly extending arms 507a and 507b, which are respectively connected to lead wires 509 and 510. A power source 506 and a 504 are connected in series to the lead wires 509 and 510 outside the bell jar 501. A base plate 502 is disposed inside the bell jar 501 and right above the crucible 507 so that it forms an angle of θ with respect to the vertical axis of the bell jar 501.

First, the bell jar 501 is evacuated to a vacuum of about $10^{-5}$ mmHg while the switch 504 is open. Then the switch 504 is closed to supply a power while adjusting an output of the power source 506 until the crucible is heated to an incandescent state of an appropriate temperature for evaporating the crystal 508. About 100 amps. of current is required for giving an appropriate temperature range (700°–1000° C.). The crystal 508 is then evaporated off to form an upward molecular stream denoted by S in the figure. The stream S is incident on the base plate 502 with an angle thereto of θ (about 35 degrees) to coat the base plate 502. The angle θ is the above mentioned incident angle and the direction of the stream S in the "oblique or tilt vapor deposition direction". The thickness of the film is determined base on the calibration of the thickness with respect to the operation time which is effected prior to the introduction of the base plate 502 into the bell jar 501. After an appropriate thickness of the film is formed, a power supply from the source 506 is decreased, the switch 504 is opened, and the bell jar 501 and the interior thereof are cooled. Then, the pressure in the bell jar is raised to atmospheric pressure and the base plate 502 is taken out from the bell jar 501.

Figure 9A:
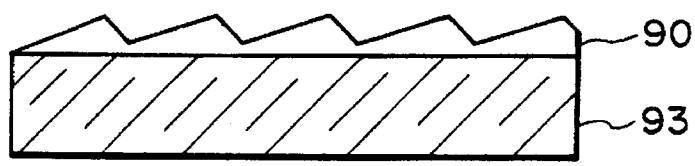
FIG. 9A is a sectional view of an oblique deposited orientation controlling film formed on a base plate.
Figure 9B:
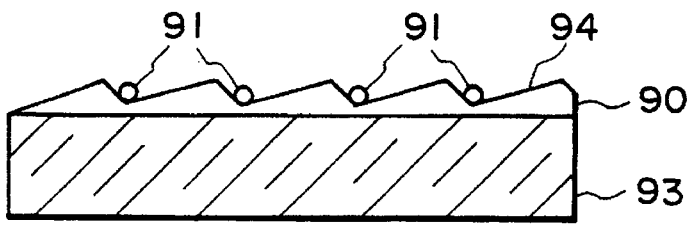
FIG. 9B is a sectional view of such an obliquely deposited orientation controlling film carrying liquid crystal molecules in an aligned form in cholesteric or smectic A phase.
Figure 9C:
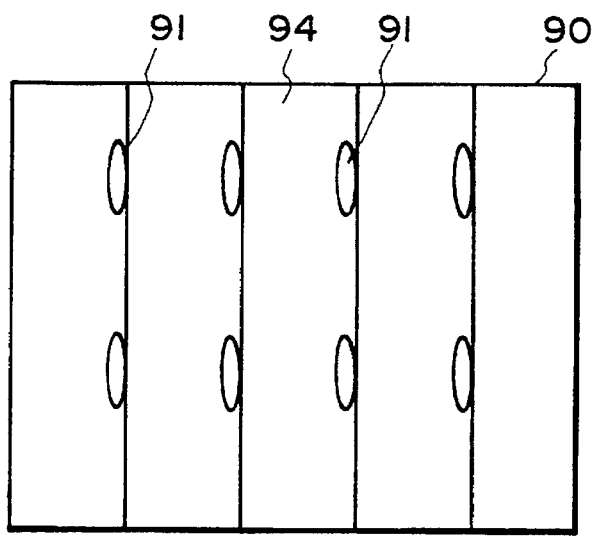
FIG. 9C is a plan view corresponding to FIG. 9B.
Figure 9D:
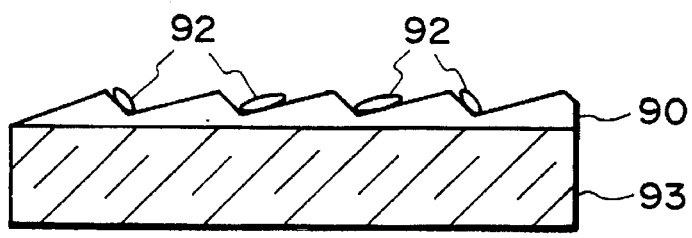
FIG. 9D is a sectional view of such an obliquely deposited orientation controlling film carrying liquid crystal molecules in chiral smectic C phase.

The above-described oblique vapor deposition process using an apparatus shown in FIG. 5 provides an orientation controlling film 90 on a substrate 92 having a cross-sectional shape as shown in FIG. 9A. The orientation controlling film 90 has a function of aligning or orientating molecular axes 91 of a cholesteric liquid crystal or a smectic A liquid crystal in parallel with a wedge or stripe-shaped pattern 94 of the film 90 as shown in FIGS. 9B and 9C. A chiral smectic liquid crystal may be formed by cooling from its cholesteric phase or smectic A phase, and liquid crystal molecules in the chiral smectic phase are caused to have molecular long axes 92 tilted from the molecular long axes 91 in the smectic A phase. The molecular long axes 92 are aligned on slopes of the obliquely deposited orientation controlling film 90 as shown in FIG. 9D to provide a pretilt inherent to such an obliquely deposited orientation controlling film 90. The angle of such a pre-tilt may be generally 5 degrees or higher, preferably 5–45 degrees.

In still another embodiment, the orientation controlling film 105 may be formed by first forming a uniform film of the above-mentioned inorganic or organic insulating material on, i.e., in contact with or above, the base plate 101a and then subjecting the surface of the film to the oblique or tilt etching to provide the surface with an orientation controlling effect.

It is preferred that the orientation controlling film 105 is also caused to function as an insulating film. For this purpose, the orientation controlling film may preferably have a thickness in the range of 100 Å to 1μ, especially 500 Å to 5000 Å. The insulating film also has a function of preventing the occurrence of an electric current which is generally caused due to minor quantities of impurities contained in the liquid crystal layer 103, whereby deterioration of the liquid crystal compounds is prevented even after repeated operations.

In the liquid crystal device according to the present invention, it is possible to form an orientation controlling film similar to the orientation controlling film 105 also on the other base plate 101.

A similar orientation controlling effect can also be imparted to the side walls of spacers 104 in the structure shown in FIG. 3, for example, by rubbing.

In the cell structure shown in FIG. 3, the liquid crystal layer 103 may be formed into a chiral smectic phase such as SmC*, SmH*, SmF*, SmI* or SmG*. The liquid crystal layer 103 having a chiral smectic phase is formed by first forming an SmA (smectic A) phase through phase transition from a cholesteric phase, particularly a cholesteric phase with a grandjean texture, on cooling and by further phase transition on cooling into a chiral smectic phase such as SmC* or SmH*.

One important aspect of the present invention is that, when a liquid crystal composition containing a liquid crystal showing a cholesteric phase is transformed from a higher temperature phase into SmA phase, the axes of the liquid crystal molecules of the SmA phase are aligned or oriented in the orientation controlling direction imparted to the orientation controlling film, whereby a uniform monodomain is formed.

Figure 4:
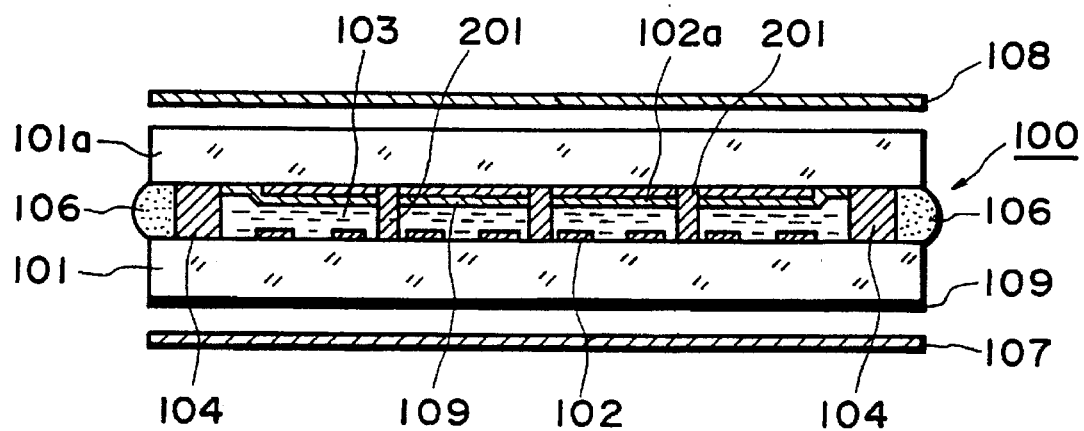
FIG. 4 is a sectional view showing another example of the liquid crystal device according to the present invention.

FIG. 4 shows another embodiment of the liquid crystal device according to the present invention. In the liquid crystal device shown in FIG. 4, a plurality of spacer members 201 are disposed between a pair of base plates 101 and 101a. The spacer members 201 can be provided, for example, by forming a film of an inorganic compound such as SiO, $SiO_2$, $Al_2O_3$ and $TiO_2$, or a resin such as polyvinyl alcohol, polyimide, polyamide-imide, polyester-imide, polyparaxylylene, polyester, polycarbonate, polyvinyl acetal, polyvinyl chloride, polyvinyl acetate, polyamide, polystyrene, cellulose resin, melamine resin, urea resin, acrylic resin and a photoresist resin on the base plate 101 on which an orientation controlling film 105 has not been provided, and by etching the film to leave the spacer members 201 at appropriate parts.

A similar orientation effect as explained with reference to the surface of the base plate 101 or 101a can also be imparted to the side wall of the spacer members 104 and 201.

Such a cell structure 100 having base plates 101 and 101a as shown in FIG. 3 or FIG. 4 is sandwiched between a pair of polarizers 107 and 108 to form an optical modulation device causing optical modulation when a voltage is applied between electrodes 102 and 102a.

Next, a process for producing the liquid crystal device according to the present invention by orientation-controlling the liquid crystal layer 103 is explained more specifically, with reference to FIG. 3.

First, a cell 100 containing a liquid crystal according to the present invention is set in such a heating case (not shown) that the whole cell 100 is uniformly heated therein. Then, the cell 100 is heated to a temperature where the liquid crystal in the cell assumes as isotropic phase. The temperature of the heating case is decreased, whereby the liquid crystal composition is subjected to a temperature decreasing stage. In the temperature decreasing stage, the liquid crystal composition in the isotropic phase is transformed into SmA either directly or through a cholesteric phase having a grandjean texture. Herein, the axes of the liquid crystal molecules in the SmA phase are aligned in the rubbing direction.

Then, the liquid crystal in the SmA phase is transformed into a chiral smectic phase such as SmC* on further cooling, whereby a monodomain of the chiral smectic phase with a non-spiral structure is formed if the cell thickness is of the order of, for example, 1 μm.

Figure 6:
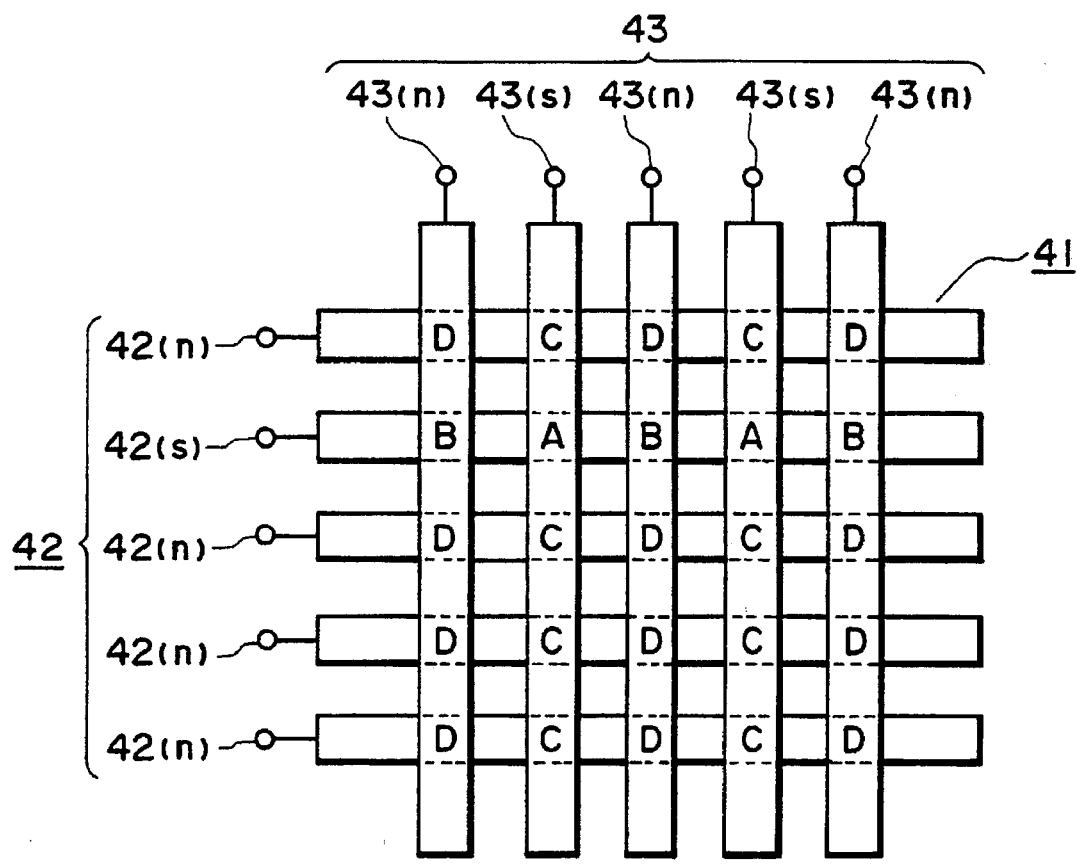
FIG. 6 is a schematic plan view showing an electrode arrangement of a liquid crystal device used in the present invention.
Figure 7A:
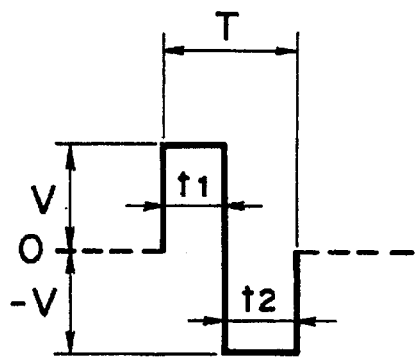
FIGS. 7A to 7D illustrate signals for driving a liquid crystal device used in the present invention.
Figure 7B:
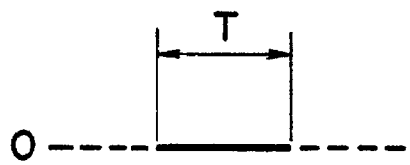
Figure 7C:
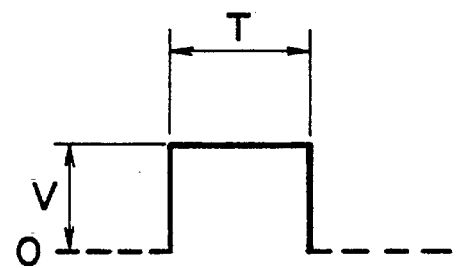
Figure 7D:
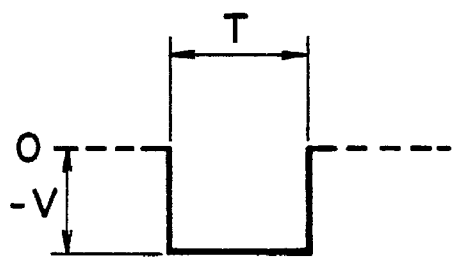
Figure 8A:
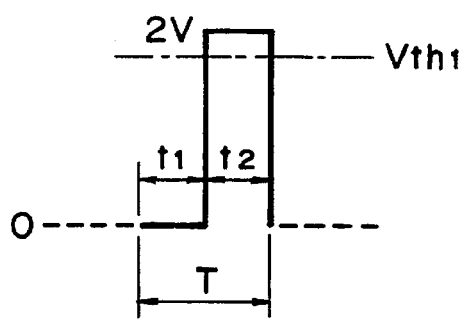
FIGS. 8A to 8D illustrate waveforms applied to respective picture elements.
Figure 8C:
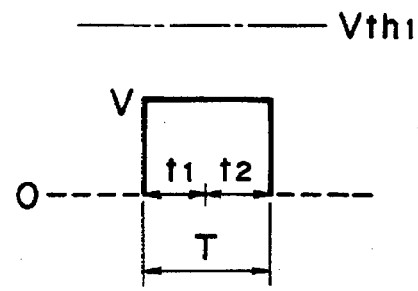
Figure 8B:
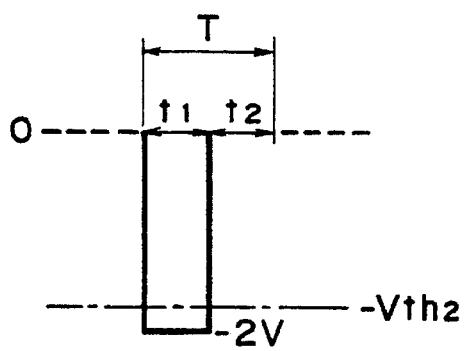
Figure 8D:
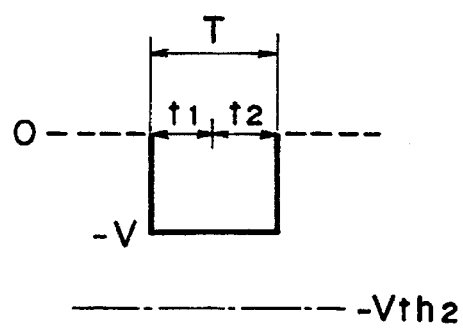

Referring to FIG. 6, there is schematically shown an example of a cell 41 having a matrix electrode arrangement in which a ferroelectric liquid crystal compound is interposed between a pair of groups of electrodes oppositely spaced from each other. Reference numerals 42 and 43 respectively denote a group of scanning electrodes to which scanning signals are applied and a group of signal electrodes to which information signals are applied. Referring to FIGS. 7A and 7B, there are respectively shown electric signals applied to a selected scanning electrode 42(s) and electric signals applied to the other scanning electrodes (non-selected scanning electrodes) 42(n). On the other hand, FIGS. 7C and 7D show electric signals applied to the selected signal electrode 43(s) and electric signals applied to the non-selected signal electrodes 43(n), respectively. In FIGS. 7A to 7D, the abscissa and the ordinate represent a time and a voltage, respectively. For instance, when displaying a motion picture, the group of scanning electrodes 42 are sequentially and periodically selected. If a threshold voltage for giving a first stable state of the liquid crystal having bistability is referred to as $V_{th1}$ and a threshold voltage for giving a second stable state thereof as $-V_{th2}$, an electric signal applied to the selected scanning electrode 42(s) is an alternating voltage showing V at a phase (time) $t_1$ and $-V$ at a phase (time) $t_2$, as shown in FIG. 7A. The other scanning electrodes 42(n) are grounded as shown in FIG. 7B. Accordingly, the electric signals appearing thereon show zero volt. On the other hand, an electric signal applied to the selected signal electrode 43(s) shows V as indicated in FIG. 7C while an electric signal applied to the non-selected signal electrode 43(n) shows $-V$ as indicated in FIG. 7D. In this instance, the voltage V is set to a desired value which satisfies $V<V_{th1}<2$ V and $-V>-V_{th2}>-2$ V. Voltage waveforms applied to each picture element when such electric signals are given are shown in FIG. 8. Waveforms shown in FIGS. 8A, 8B, 8C and 8D correspond to picture elements A, B, C and D shown in FIG. 6, respectively. Namely, as seen from FIG. 8A, a voltage of 2 V above the threshold level $V_{th1}$ is applied to the ferroelectric liquid crystal electrically connected to the picture elements A on the selected scanning line at a phase of $t_2$. Further, a voltage of $-2$ V above the threshold level $-V_{th2}$ is applied to the ferroelectric liquid crystal electrically connected to the picture elements B on the same scanning line at a phase of $t_1$. Accordingly, depending upon whether a signal electrode is selected or not on a selected scanning electrode line, the orientation of liquid crystal molecules changes. Namely, when a certain signal electrode is selected, the liquid crystal molecules are oriented to the first stable state, while when not selected, are oriented to the second stable state. In either case, the orientation of the liquid crystal molecules is not related to the previous states of each picture element.

On the other hand, as indicated by the picture elements C and D on the non-selected scanning lines, a voltage applied to all picture elements C and D is +V or $-V$, each not exceeding the threshold level. Accordingly, the ferroelectric liquid crystal molecules electrically connected to the respective picture elements C and D are placed in the orientations corresponding to signal states produced when they have been last scanned without change in orientation. Namely, when a certain scanning electrode is selected, signals corresponding to one line are written and thus writing of signals corresponding to one frame is completed. The signal state of each picture element can be maintained until the line is subsequently selected. Accordingly, even if the number of scanning lines increases, the duty ratio does not substantially change, resulting in no possibility of lowering in contrast, occurrence of crosstalk, etc. In this instance, the magnitude of the voltage V and length of the phase $(t_1+t_2)=T$ usually ranges from 3 volts to 70 volts and from 0.1 μsec to 2 msec, respectively, although they change depending upon the thickness of a liquid crystal material or a cell used. In this way, the electric signals applied to a selected scanning electrode can cause either direction of change in state, i.e., from a first stable state (defined herein as "bright" state when converted to corresponding optical signals) to a second stable state (defined as "dark" state when converted to corresponding optical signals), or vice versa.

Compared with a case where a liquid crystal showing a chiral smectic phase such as DOBAMBC, HOBACPC, or MBRA 8 is used alone, the liquid crystal composition used in the present invention containing a liquid crystal showing a cholesteric phase has a better orientation characteristic and gives an orientation or alignment state free of orientation defects.

As for the extent of orientation controlling treatment, it is preferred to impart such as orientation controlling treatment or layer to only one of the pair of base plates in order to give a faster response speed because a weaker constraining force acting on liquid crystal molecules on the surface of the base plate (or a weaker orientation controlling effect imparted to the base plate) favors a better switching characteristic (faster response speed), especially when a thin cell is used or a chiral smectic phase such as SmC*, SmH*, SmF*, SmI* or SmG* having bistability (memory characteristic) is formed. For example, with respect to a cell having a thickness of 2 μm or less, a cell in which only one base plate has been subjected to orientation controlling treatment gives about twice as fast a response speed as that obtained by a cell in which both base plates have been treated for orientation control.

The present invention will be further explained with reference to working examples.

EXAMPLE 1

On a square glass base plate were formed ITO (Indium-Tin-Oxide) electrode films in the form of stripes with a width of 62.5 μm at a pitch of 100 μm. In an apparatus for the oblique vapor deposition as shown in FIG. 5, the base plate was disposed with its face having the ITO film being directed downward and a crystal of $SiO_2$ was set in a crucible of molybdenum. Then the vapor deposition apparatus was evacuated to a vacuum of the order of $10^{-5}$ mmHg and $SiO_2$ was obliquely vapor-deposited in a prescribed manner to form an electrode plate with an 800 μ-thick oblique vapor deposition film (A electrode plate).

On the other hand, on a similar glass plate provided with stripe-form ITO electrode films was applied a polyimide-forming solution ("PIQ": polyimide-isoindolquinazolinedione, produced by Hitachi Kasei Kogyo K.K.; Non-volatile content: 14.5 wt. %) by means of a spinner coater, which was then heated at 80° C. for 30 minutes, at 200° C. for 60 minutes and at 350° C. for 30 minutes to form a film of 800 Å in thickness (B electrode plate).

Then, a heat-setting epoxy adhesive was applied to the periphery of the A electrode plate except for the portion forming an injection port by screen printing process. The A electrode plate and the B electrode plate were superposed with each other so that their stripe-pattern electrodes crossed each other with right angles and secured to each other with a polyimide spacer while leaving the gap of 2μ therebetween, thereby to form a cell (blank cell).

Separately, a liquid crystal composition was prepared by mixing 5 parts by weight of cholesteryl nonanate with 100 parts by weight of p-decyloxybenzylidene-p'-amino-2-methylbutyl cinnamate (DOBAMBC).

The liquid crystal composition was heated into the isotropic phase and injected through the injection port of the above-prepared cell, and the injection port was sealed. The liquid crystal cell thus formed was gradually cooled at a rate of 0.5° C./hr and, at a constant temperature of bout 70° C., was observed through a microscope while being sandwiched between a pair of polarizers arranged in the cross nicol relationship, whereby a monodomain of SmC* phase whose spiral had been loosened was found to be formed.

EXAMPLE 2

On a square glass plate provided with stripe-form ITO electrode films as used in Example 1 was applied a polyimide-forming solution ("PIQ", produced by Hitachi Kasei Kogyo K.K.; Non-volatile content: 14.5 wt. %) by means of a spinner coater, which was then heated at 80° C.

for 30 minutes, at 200° C. for 60 minutes and at 350° C. for 30 minutes to form a film of 800 Å in thickness (A electrode plate).

A similar electrode plate provided with a polyimide film was subjected to a rubbing treatment to produce a B electrode plate.

Then, a heat-setting epoxy adhesive was applied to the periphery of the A electrode plate except for the portion forming an injection port by screen printing process. The A electrode plate and the B electrode plate were superposed with each other so that their stripe-pattern electrodes crossed each other with right angles and secured to each other with a polyimide spacer while leaving the gap of 2μ therebetween, thereby to form a cell (black cell).

Separately, a liquid crystal composition was prepared by mixing 10 parts by weight of 4-(2-methylbutyl)phenyl-4'-decyloxybenzoate with 100 parts by weight of DOBAMBC.

The liquid crystal composition was heated into the isotropic phase and injected through the infection port of the above-prepared cell, and the infection port was sealed. The liquid crystal cell thus formed was gradually cooled at a rate of 0.5° /hr and, at a constant temperature of about 65° C., was observed through a microscope while being sandwiched between a pair of polarizers arranged in the cross nicol relationship, whereby a monodomain of an SmC* phase whose spiral had been loosened was found to be formed.

EXAMPLE 3

A blank cell as used in Example 1 was provided.

Separately, a liquid crystal composition was prepared by mixing 8 parts by weight of 4-hexyloxyphenyl-4-(2"-methylbutyl)biphenyl-4'-carboxylate with 100 parts by weight of DOBAMBC.

The liquid crystal composition was heated into the isotropic phase and infected through the injection port of the above-prepared cell, and the injection port was sealed. The liquid crystal cell thus formed was gradually cooled at a rate of 0.5° C./hr and was observed through a microscope while being sandwiched between a pair of polarizers arranged in the cross nicol relationship, whereby a monodomain of SmC* phase whose spiral had been loosened was found to be formed.

EXAMPLE 4

A blank cell as used in Example 1 was provided.

Separately, a liquid crystal composition was prepared by mixing 5 parts by weight of 4-heptylphenyl-4-(4"-methylhexyl)biphenyl-4'-carboxylate with 100 parts by weight of DOBAMBC.

The liquid crystal composition was heated into the isotropic phase and infected through the infection port of the above-provided cell, and the injection port was sealed. The liquid crystal cell thus formed was gradually cooled at a rate of 0.5° C./hr and was observed through a microscope while being sandwiched between a pair of polarizers arranged in the cross nicol relationship, whereby a monodomain of SmC* phase whose spiral had been loosened was found to be formed.

EXAMPLE 5

A blank cell as used in Example 1 was provided.

Separately, a liquid crystal composition was prepared by mixing 5 parts by weight of cholesteryl nonanate with 100 parts by weight of 4-hexyloxyphenyl-4-(2"-methylbutyl) biphenyl-4'-carboxylate.

The liquid crystal composition was heated into the isotropic phase and injected through the injection port of the above-provided cell, and the injection port was sealed. The liquid crystal cell thus formed was gradually cooled at a rate of 0.5° C./hr and was observed through a microscope while being sandwiched between a pair of polarizers arranged in the cross nicol relationship, whereby a monodomain of SmC* phase with non-spiral structure was found to be formed.

The device containing the liquid crystal composition in the SmC* phase was held under the condition for 500 hours and then subjected to similar microscopic observation, whereby the SmC* phase with non-spiral structure was found to be retained.

On the other hand, as a comparative experiment, a liquid crystal device was prepared in the same manner as described above except that the cholesteryl nonanate was omitted. The liquid crystal device was subjected to similar microscopic observation. As a result, a monodomain of SmC* phase with non-spiral structure was found to be formed at the initial stage whereas the monodomain of SmC* phase was not retained after the 500 hours of durability test.

EXAMPLE 6

A blank cell as used in Example 2 was provided.

Separately, a liquid crystal composition was prepared by mixing 10 parts by weight of 4-(2-methylbutyl)phenyl-4'-decyloxybenzoate with 100 parts by weight of 4-octyloxyphenyl-4-(2"-methylbutyl)biphenyl-4'-carboxylate.

The liquid crystal composition was heated into the isotropic phase and injected through the injection port of the above provided cell, and the injection port was sealed. The liquid crystal cell thus formed was gradually cooled at a rate of 0.5° C./hr and, at a constant temperature of about 65° C., was observed through a microscope while being sandwiched between a pair of polarizers arranged in the cross nicol relationship, whereby a monodomain of SmC* phase whose spiral had been loosened was found to be formed.

The device containing the liquid crystal composition in the SmC* phase was held under the condition for 700 hours and then subjected to similar microscopic observation, whereby the SmC* phase with non-spiral structure was found to be retained.

On the other hand, as a comparative experiment, a liquid crystal device was prepared in the same manner as described above except that the 4-(2-methylbutyl)-phenyl-4'-decyloxybenzoate was omitted. The liquid crystal device was subjected to similar microscopic observation. As a result, a monodomain of SmC* phase with non-spiral structure was found to be formed at the initial stage whereas the monodomain of SmC* phase was not retained after the 700 hours of durability test.

EXAMPLES 7–9

Liquid crystal devices were prepared in the same manner as in Example 6 except that the 4-(2-methyl-butyl)phenyl-4'-decyloxybenzoate was replaced by 4-(2"-methylbutyl)4'-cyanobiphenyl (Example 7), cholesteryl benzoate (Example 8) and 4-(2"-methylbutyloxy)4'-cyanobiphenyl (Example 9), respectively. The liquid crystal devices were subjected to similar microscopic observation, whereby a monodomain of SmC* with non-spiral structure was respectively found to be formed and observed to be retained after the 700 hours of the durability test as carried out in Example 6.

EXAMPLE 10

A transparent electrode film consisting primarily of indium oxide was formed on a polyethylene terephthalate base film of 100 μm in thickness with the surface temperature of the base film being suppressed to below 120° C. by means of a low-temperature sputtering apparatus, thereby to provide a plastic substrate. A solution having the following composition (Solution Composition (1)) was applied on the plastic substrate and dried at 120° C. for 30 minutes to form a coating film.

| Solution composition (1) | |
| --- | --- |
| Acetomethoxyaluminum diisopropylate | 1 g |
| Polyester resin (Bylon 30P, mfd. by Toyobo K.K.) | 0.5 g |
| Tetrahydrofuran | 100 ml |

The coating film on the plastic substrate was then rubbed in one direction under the pressure of 100 g/cm$^2$. A pair of the thus rubbing-treated plastic substrate were superposed with each other so that their rubbing directions were in parallel with each other and secured to each other with a gap of 1μ therebetween by sealing the periphery except for a port for liquid crystal injection, whereby a blank cell was prepared.

Separately, a liquid crystal composition was prepared by mixing 4 parts by weight of 4-(2-methylbutyl)-4'-hexyloxyazobenzene with 100 parts by weight of 4-hexyloxyphenyl-4-(2"-methylbutyl)biphenyl-4'-carboxylate.

The liquid crystal composition was heated into the isotropic phase and injected through the injection port and into the above-provided cell under vacuum, and the injection port was sealed. The liquid crystal cell thus formed was gradually cooled at a rate of 0.5° C./hr and was observed through a microscope while being sandwiched between a pair of polarizers arranged in the cross nicol relationship, whereby a monodomain of SmC* phase with non-spiral structure was found to be formed.

The device containing the liquid crystal composition in the SmC* phase was held under the condition for 500 hours and then subjected to similar microscopic observation, whereby the SmC* phase with non-spiral structure was observed to be retained.

On the other hand, as a comparative experiment, a liquid crystal device was prepared in the same manner as described above except that the 4-(2-methylbutyl)-4'-hexyloxyazobenzene was omitted. The liquid crystal device was subjected to similar microscopic observation. As a result, a monodomain of SmC* phase with non-spiral structure was found to be formed at the initial stage, whereas the monodomain of SmC* phase was not retained after the 500 hours of durability test.

EXAMPLE 11

A glass plate, on which stripes of ITO electrode film were provided in a width of 62.5 μm and at a pitch of 100 μm, was further coated with a coating solution having the following solution composition (6).

| Solution composition (6) | |
| --- | --- |
| Tetraisopropoxytitanium | 1 g |
| Condensation product of pyromellitic anhydride and 4,4'-diaminodiphenyl ether as a polyimide precursor (polyamide acid) | 0.5 g (solid) |
| Isopropyl alcohol | 50 ml |
| Ethanol | 50 ml |

The thus coated glass substrate was further heated at 230° C. for 1 hour to cause a dehydration-ring closure reaction, thereby to convert the coating film into a polyimide film.

The polyimide film on the glass substrate was then rubbed in one direction under the pressure of 100 g/cm$^2$. A pair of the thus rubbing-treated plastic substrate were superposed each other so that their rubbing directions were in parallel with each other and secured to each other with a gap of 1μ therebetween by sealing the periphery except for a port for liquid crystal injection, whereby a blank cell was prepared.

Separately, a liquid crystal composition was prepared by mixing 4 parts by weight of 4-cyanobenzylidene-4'-(2-methylbutyl)aniline with 100 parts by weight of 4-octyloxyphenyl-4-(2"-methylbutyl)biphenyl-4'-carboxylate.

The liquid crystal composition was heated into the isotropic phase and injected through the injection port and into the above-provided cell under vacuum, and the injection port was sealed. The liquid crystal cell thus formed was gradually cooled at a rate of 0.5° C./hr and was observed through a microscope while being sandwiched between a pair of polarizers arranged in the cross nicol relationship, whereby a monodomain of SmC* phase with non-spiral structure was found to be formed.

The device containing the liquid crystal composition in the SmC* phase was held under the condition for 800 hours and then subjected to similar microscopic observation, whereby the SmC* phase with non-spiral structure was found to be retained.

On the other hand, as a comparative experiment, a liquid crystal device was prepared in the same manner as described above except that the 4-cyanobenzylidene-4'-(2-methylbutyl)aniline was omitted. The liquid crystal device was subjected to similar microscopic observation. As a result, a monodomain of SmC* phase with non-spiral structure was found to be formed at the initial stage whereas the monodomain of SmC* phase was not retained after the 800 hours of durability test.

EXAMPLE 12

A blank cell as used in Example 1 was provided.

Separately, a liquid crystal composition was prepared by mixing 5 parts by weight of cholesteric nonanate with 100 parts by weight of 4-(2'-methylbutyl)-phenyl-4'-octyloxybiphenyl-4-carboxylate.

The liquid crystal composition was heated into the isotropic phase and injected through the injection port of the above-provided cell, and the injection port was sealed. The liquid crystal cell thus formed was gradually cooled at a rate of 0.5° C./hr and was observed through a microscope while being sandwiched between a pair of polarizers arranged in the cross nicol relationship, whereby a monodomain of SmC* phase with non-spiral structure was found to be formed.

The device containing the liquid crystal composition in the SmC* phase was held under the condition for 500 hours and then subjected to similar microscopic observation, whereby the SmC* phase with non-spiral structure was found to be retained.

On the other hand, as a comparative experiment, a liquid crystal device was prepared in the same manner as described above except that the cholesteryl nonanate was omitted. The liquid crystal device was subjected to similar microscopic observation. As a result, a monodomain of SmC* phase with non-spiral structure was found to be formed at the initial stage whereas the monodomain of SmC* phase was not retained after the 500 hours of durability test.

EXAMPLE 13

A blank cell as used in Example 2 was provided.

Separately, a liquid crystal composition was prepared by mixing 10 parts by weight of 4-(2-methylbutyl)phenyl-4'-decyloxybenzoate with 4-(2'-methylbutyl)phenyl-4'-octyloxybiphenyl-4-carboxylate.

The liquid crystal composition was heated into the isotropic phase and injected through the injection port and into the above-provided cell, and the injection port was sealed. The liquid crystal cell thus formed was gradually cooled at a rate of 0.5° C./hr and was observed through a microscope while being sandwiched between a pair of polarizers arranged in the cross nicol relationship, whereby a monodomain of SmC* phase with non-spiral structure was found to be formed.

The device containing the liquid crystal composition in the SmC* phase was held under the condition for 700 hours and then subjected to similar microscopic observation, whereby the SmC* phase with non-spiral structure was found to be retained.

On the other hand, as a comparative experiment, a liquid crystal device was prepared in the same manner as described above except that the 4-(2-methylbutyl)-phenyl-4'-decyloxybenzoate was omitted. The liquid crystal device was subjected to similar microscopic observation. As a result, a monodomain of SmC* phase with non-spiral structure was found to be formed at the initial stage whereas the monodomain of SmC* phase was not retained after the 700 hours of durability test.

EXAMPLES 14 AND 15

Liquid crystal devices were prepared in the same manner as in Example 13 except that the 4-(2'-methylbutyl)phenyl-4'-octyloxybiphenyl-4-carboxylate was replaced by 4-pentylphenyl-4-(4'-methylhexyl)phenyl-4'-carboxylate (Example 14), and p-n-octyloxybenzoic acid-p'-(2-methylbutyloxy)phenyl ester (Example 15), respectively. The liquid crystal devices were subjected to similar microscopic observation whereby a monodomain of SmC* with non-spiral structure was respectively found to be formed and observed to be retained after the 700 hours of the durability test as carried out in Example 13.

EXAMPLES 16–18

Liquid crystal devices were prepared in the same manner as in Example 13 except that the 4-(2-methylbutyl)phenyl-4'-decyloxybenzoate was replaced by 4-(2"-methylbutyl)-4'-cyanobiphenyl (Example 16), cholesteryl benzoate (Example 17) and 4-(2'-methylbutyloxy)-4'-cyanobiphenyl (Example 18), respectively. The liquid crystal devices were subjected to similar microscopic observation whereby a monodomain of SmC* with non-spiral structure was respectively found to be formed and observed to be retained after the 700 hours of the durability test as carried out in Example 13.

EXAMPLE 19

A blank cell as used in Example 10 was provided.

Separately, a liquid crystal composition was prepared by mixing 4 parts by weight of 4-(2-methylbutyl)-4'-hexyloxyazobenzene with 100 parts by weight 4-(2'-methylbutyl)phenyl-4'-octyloxybiphenyl-4-carboxylate.

The liquid crystal composition was heated into the isotropic phase and injected through the injection port of the above-provided cell, and the injection port was sealed. The liquid crystal cell thus formed was gradually cooled at a rate of 0.5° C./hr and was observed through a microscope while being sandwiched between a pair of polarizers arranged in the cross nicol relationship, whereby a monodomain of SmC* phase with non-spiral structure was found to be formed.

The device containing the liquid crystal composition in the SmC* phase was held under the condition for 500 hours and then subjected to similar microscopic observation, whereby the SmC* phase with non-spiral structure was found to be retained.

On the other hand, as a comparative experiment, a liquid crystal device was prepared in the same manner as described above except that the 4-(2-methylbutyl)-4'-hexyloxyazobenzene was omitted. The liquid crystal device was subjected to similar microscopic observation. As a result, a monodomain of SmC* phase with non-spiral structure was found to be formed at the initial stage whereas the monodomain of SmC* phase was not retained after the 500 hours of durability test.

EXAMPLES 20–22

Liquid crystal devices were prepared in the same manner as in Example 19 except that the 4-(2-methylbutyl)-4'-hexyloxyazobenzene was replaced y 4-(2"-methylbutyl)-4'-cyanobiphenyl (Example 20), cholesteryl benzoate (Example 21) and 4-(2"-methylbutyloxy)-4'-cyanobiphenyl (Example 22), respectively. The liquid crystal devices were subjected to similar microscopic observation whereby a monodomain of SmC* with non-spiral structure was respectively found to be formed and observed to be retained after the 500 hours of the durability test as carried out in Example 19.

EXAMPLE 23

A blank cell as used in Example 1 was provided.

Separately, a liquid crystal composition was prepared by mixing 75 parts by weight of 4-hexyloxyphenyl-4-(2"-methylbutyl)biphenyl-4'-carboxylate with 100 parts by weight of 4-(2'-methylbutyl)phenyl-4'-octyloxybiphenyl-4-carboxylate.

The liquid crystal composition was heated into the isotropic phase and injected through the injection port of the above-provided cell, and the injection port was sealed. The liquid crystal cell thus formed was gradually cooled at a rate of 0.5° C./hr and was observed through a microscope while being sandwiched between a pair of polarizers arranged in the cross nicol relationship, whereby a monodomain of SmC* phase with non-spiral structure was found to be formed.

The device containing the liquid crystal composition in the SmC* phase was held under the condition for 700 hours and then subjected to similar microscopic observation, whereby the SmC* phase with non-spiral structure was found to be retained.

On the other hand, as comparative experiments, liquid crystal devices were prepared in the same manner as described above except that the two liquid crystals used in the above liquid crystal device were separately used. The liquid crystal devices were subjected to similar microscopic observation. As a result, in each case, a monodomain of SmC* phase with non-spiral structure was found to be formed at the initial stage whereas the monodomain of SmC* phase was not retained after the 700 hours of durability test.

Further, when 20 parts by weight of DOBAMBC was added to 100 parts by weight of the above-mentioned liquid crystal composition to obtain a liquid crystal composition. The thus obtained liquid crystal composition was used to prepare a liquid crystal device in the same manner. The liquid crystal device was subjected to similar microscopic observation, whereby a monodomain of SmC* phase with non-spiral structure was found to be formed and observed to be retained after the durability test for a prolonged time which was 1000 hours longer than that in the above-mentioned example.

EXAMPLE 24

A blank cell as used in Example 2 was provided.

Separately, a liquid crystal composition was prepared by mixing 70 parts by weight of 4-(octyloxyphenyl)-4-(2"-methylbutyl)biphenyl-4'-carboxylate with 100 parts by weight of 4-pentylphenyl-4-(4"-methylhexyl)biphenyl-4'-carboxylate.

The liquid crystal composition was heated into the isotropic phase and injected through the injection port and into the above-provided cell, and the injection port was sealed. The liquid crystal cell thus formed was gradually cooled at a rate of 0.5° C./hr and was observed through a microscope while being sandwiched between a pair of polarizers arranged in the cross nicol relationship, whereby a monodomain of SmC* phase with non-spiral structure was found to be formed.

The device containing the liquid crystal composition in the SmC* phase was held under the condition for 700 hours and then subjected to similar microscopic observation, whereby the SmC* phase with non-spiral structure was found to be retained.

On the other hand, as comparative experiments, liquid crystal devices were prepared in the same manner as described above except that the two liquid crystals used in the above liquid crystal device were separately used. The liquid crystal devices were subjected to similar microscopic observation. As a result, in each case, a monodomain of SmC* phase with non-spiral structure was found to be formed at the initial stage, whereas the monodomain of SmC* phase was not retained after the 700 hours of durability test.

Further, when 20 parts by weight of DOBAMBC was added to 100 parts by weight of the above-mentioned liquid crystal composition to obtain a liquid crystal composition. The thus obtained a liquid crystal composition was used to prepare a liquid crystal device in the same manner. The liquid crystal device was subjected to similar microscopic observation whereby a monodomain of SmC* phase with non-spiral structure was found to be formed and observed to be retained after the durability test for a prolonged time which was 1000 hours longer than that in the above-mentioned example.

EXAMPLES 25 AND 26

Liquid crystal devices were prepared in the same manner as in Example 23 except that the 4-(2-methylbutyl)phenyl-4'-octyloxybiphenyl-4-carboxylate was replaced by 4-pentylphenyl-4-(4"-methylhexyl)-biphenyl-4'-carboxylate (Example 25), and p-n-octyloxybenzoic acid-p'-(2-methylbutyloxy)phenyl-ester (Example 26). The liquid crystal devices were subjected to similar microscopic observation whereby a monodomain of SmC* phase with non-spiral structure was respectively found to be formed and observed to be retained after the 700 hours of the durability test as carried out in Example 23.

Further, two liquid crystal devices respectively containing three-component liquid crystal compositions were prepared in the same manner as explained in Example 23 except that HOBACPC was used in place of DOBAMBC. The liquid crystal devices were subjected to similar microscopic observation, whereby a monodomain of SmC* with non-spiral structure was observed to be formed at the initial stage and retained after the durability for 1700 hours for each device.

EXAMPLE 27

A blank cell as used in Example 10 was provided.

Separately, a liquid crystal composition was prepared by mixing 80 parts by weight of 4-hexyloxyphenyl-4-(2"-methylbutyl)biphenyl-4'-carboxylate with 100 parts by weight of 4-(2'-methylbutyl)phenyl-4'-octyloxybiphenyl-4-carboxylate.

The liquid crystal composition was heated into the isotropic phase and injected through the injection port of the above-provided cell, and the injection port was sealed. The liquid crystal cell thus formed was gradually cooled at a rate of 0.5° C./hr and was observed through a microscope while being sandwiched between a pair of polarizers arranged in the cross nicol relationship, whereby a monodomain of SmC* phase with non-spiral structure was found to be formed.

The device containing the liquid crystal composition in the SmC* phase was held under the condition for 500 hours and then subjected to similar microscopic observation, whereby the SmC* phase with non-spiral structure was found to be retained.

On the other hand, as comparative experiments, liquid crystal devices were prepared in the same manner as described above except that the two liquid crystals used in the above liquid crystal device were separately used. The liquid crystal devices were subjected to similar microscopic observation. As a result, in each case, a monodomain of SmC* phase with non-spiral structure was found to be formed at the initial stage, whereas the monodomain of SmC* phase was not retained after the 500 hours of durability test.

Further, when 20 parts by weight of OOBAMBCC was added to 100 parts by weight of the above-mentioned liquid crystal composition to obtain a liquid crystal composition. The thus obtained a liquid crystal composition was used to prepare a liquid crystal device in the same manner. The liquid crystal device was subjected to similar microscopic observation whereby a monodomain of SmC* phase with non-spiral structure was found to be formed at the initial stage and observed to be retained after the durability test for a prolonged time which was 800 hours longer than that in the above-mentioned example.

EXAMPLES 28 AND 29

Liquid crystal devices were prepared in the same manner as in Example 27 except that the 4-(2'-methylbutyl)phenyl- 4'-octyloxybiphenyl-4-carboxylate was replaced by 4-pentylphenyl-4-(4"-methylhexyl)-biphenyl-4'-carboxylate (Example 28) and p-n-octyloxybenzoic acid-p'-(2-methylbutyloxy)phenyl ester.

The liquid crystal devices were subjected to similar microscopic observation whereby a monodomain of SmC* phase with non-spiral structure was respectively found to be formed and observed to be retained after the 700 hours of the durability test as carried out in Example 24.

Further, two liquid crystal devices respectively containing three-component liquid crystal compositions were prepared in the same manner as explained in Example 23 except that DOBAMBC was used in place of OOBAMBCC. The liquid crystal devices were subjected to similar microscopic observation, whereby a monodomain of SmC* with non-spiral structure was observed to be formed at the initial stage and retained after the durability for 2000 hours for each device.

EXAMPLES 30 AND 31

Liquid crystal devices were prepared in the same manner as in Example 24 except that the 4-pentylphenyl-4-(4"-methylhexyl)biphenyl-4'-carboxylate used in Example 24 was replaced by 4-(2'-methylbutyl)-phenyl-4'-octyloxybiphenyl-4-carboxylate (Example 30) and p-n-octyloxybenzoic acid-p'-(2-methylbutyloxy)phenyl ester. The liquid crystal devices were subjected to similar microscopic observation whereby a monodomain of SmC* phase with non-spiral structure was respectively found to be formed and observed to be retained after the 700 hours of the durability test as carried out in Example 24.

Further, two liquid crystal devices respectively containing three-component liquid crystal compositions were prepared in the same manner as explained in Example 23 except that MBRA 8 was used in place of DOBAMBC. The liquid crystal devices were subjected to similar microscopic observation, whereby a monodomain of SmC* with non-spiral structure was observed to be formed at the initial stage and retained after the durability for 1500 hours for each device.

The liquid crystal devices produced in the above examples were driven for wiring with voltage signals having waveforms as shown in FIG. 8 (driving voltage 30 V, pulse width 500 msec), whereby the written images were memorized without inversion for a duration of one frame.

What is claimed is:

1. A display apparatus, comprising:
   (a) a display panel comprising a group of scanning electrodes, a group of data electrodes intersecting the scanning electrodes, and a liquid crystal composition disposed between the scanning electrodes and the data electrodes so as to form a matrix of pixels at the intersections of the scanning electrodes and the data electrodes; said liquid crystal composition comprising a mixture of two or more compounds each showing smectic phase and at least one compound showing cholesteric phase, said liquid crystal composition showing smectic A phase and chiral smectic C phase on temperature decrease, said liquid crystal composition placed in the chiral smectic phase assuming one of two orientation states depending on a polarity of a voltage applied thereto; and
   (b) a voltage application means for:
      applying to a selected scanning electrode a first pulse of one polarity and a second pulse of an opposite polarity, and
      applying voltages to the pixels on the selected scanning electrode receiving the first and second pulses to place the pixels in one or the other of said two orientation states, respectively, and applying to the pixels on non-selected scanning electrodes voltages that maintain those pixels in preexisting orientation states.

2. A display apparatus according to claim 1, wherein said liquid crystal composition assumes cholesteric phase, smectic A phase and chiral smectic C phase on temperature decrease.

3. A display apparatus according to claim 1, wherein said compound showing cholesteric phase is a compound not showing smectic A phase.

4. A display apparatus according to claim 1, wherein said at least one compound showing cholesteric phase comprises two or more compounds each showing cholesteric phase.

* * * * *

UNITED STATES PATENT AND TRADEMARK OFFICE
CERTIFICATE OF CORRECTION

PATENT NO. : 5,648,830

DATED : July 15, 1997

INVENTOR(S): KAZUHARU KATAGIRI ET AL.        Page 1 of 4

It is certified that error appears in the above-identified patent and that said Letters Patent is hereby corrected as shown below:

[56] REFERENCES CITED

Other Publications
        After "Patel et al.": "Ferrolectrics" should
        read --Ferroelectrics--.

COLUMN 1

Line 42," draw-backs" should read --drawbacks--.

COLUMN 2

Line 15, "and" should read --an--.

COLUMN 4

Table 1, Under example 2: "p-hexaloxybenzylidene-"
        should read --p-hexyloxybenzylidene---.

COLUMN 7

Table 2, "structured" should read --structural--.

COLUMN 9

Table 2 continued, "structured" should read
        --structural--.

UNITED STATES PATENT AND TRADEMARK OFFICE
CERTIFICATE OF CORRECTION

PATENT NO. : 5,648,830

DATED : July 15, 1997

INVENTOR(S) : KAZUHARU KATAGIRI ET AL.

It is certified that error appears in the above-identified patent and that said Letters Patent is hereby corrected as shown below:

COLUMN 14

Line 45, "i part" should read --1 part--.
    Line 52, "because" should read --cause--.
    Line 64, "plate" should read plates--.

COLUMN 15

Line 10, "ar" should read --are--.

COLUMN 16

Line 43, "place" should read --placed--.
    Line 45, "paced" should read --placed--.
    Line 48, "504" should read --switch 504--.
    Line 65, "above mentioned" should read
      --above-mentioned--.
    Line 67, "base" should read --based--.

COLUMN 19

Line 66, "as" should read --an--.

COLUMN 20

Line 55, "bout" should read --about--.

UNITED STATES PATENT AND TRADEMARK OFFICE
CERTIFICATE OF CORRECTION

PATENT NO.  : 5,648,830

DATED       : July 15, 1997

INVENTOR(S) : KAZUHARU KATAGIRI ET AL.

It is certified that error appears in the above-identified patent and that said Letters Patent is hereby corrected as shown below:

COLUMN 21

Line 14, "(black" should read --(blank--.
Line 19, "infection" should read --injection--.
Line 20, "infection" should read --injection--.
Line 36, "infected" should read --injected--.
Line 52, "infected" should read --injected-- and "infection" should read --injection--.

COLUMN 22

Line 59, "(2-methyl-butyl)" should read --(2-methybutyl)--.

COLUMN 23

Line 23, "substrate" should read --substrates--.

COLUMN 24

Line 16, "substrate" should read --substrates-- and "superposed" should read --superposed with--.

COLUMN 26

Line 35, "y" should read --by--.

UNITED STATES PATENT AND TRADEMARK OFFICE
CERTIFICATE OF CORRECTION

PATENT NO. : 5,648,830

DATED : July 15, 1997

INVENTOR(S) : KAZUHARU KATAGIRI ET AL.

It is certified that error appears in the above-identified patent and that said Letters Patent is hereby corrected as shown below:

COLUMN 27

```
Line 10, "when" should be deleted.
Line 53, "when" should be deleted.
Line 56, "a" should be deleted.
```

COLUMN 28

```
Line 52, "when" should be deleted.
Line 55, "a" should be deleted.
```

COLUMN 29

```
Line 29, "(2-methylbutyloxy)phenyl" should read
  --(2-methylbutyloxy)-phenyl--.
```

Signed and Sealed this

Seventeenth Day of February, 1998

Attest:

BRUCE LEHMAN

*Attesting Officer*       Commissioner of Patents and Trademarks